United States Patent [19]

Bischoff

[11] 4,309,062

[45] Jan. 5, 1982

[54] BEARING MOVEMENT PREVENTING SYSTEM

[75] Inventor: Robert F. Bischoff, Florissant, Mo.

[73] Assignee: Emerson Electric Co., St. Louis, Mo.

[21] Appl. No.: 77,854

[22] Filed: Sep. 21, 1979

[51] Int. Cl.³ .................... F16C 23/04; F16C 25/04
[52] U.S. Cl. .................................. 308/29; 308/72;
308/161
[58] Field of Search ............. 308/22, 26, 29, 72,
308/135, 161

[56] References Cited

U.S. PATENT DOCUMENTS

| | | | |
|---|---|---|---|
| 2,460,063 | 1/1949 | Cole | 308/72 |
| 2,607,819 | 8/1952 | Sutton | 308/29 |
| 3,966,278 | 6/1976 | Lewis | 308/72 |
| 4,008,928 | 2/1977 | Abel | 308/72 |
| 4,090,749 | 5/1978 | Daniels | 308/72 |

FOREIGN PATENT DOCUMENTS

| | | | |
|---|---|---|---|
| 1027470 | 4/1958 | Fed. Rep. of Germany | 308/72 |
| 1027471 | 4/1958 | Fed. Rep. of Germany | 308/72 |
| 415101 | 9/1946 | Italy | 308/72 |

*Primary Examiner*—Richard R. Stearns
*Attorney, Agent, or Firm*—Polster, Polster & Lucchesi

[57] ABSTRACT

A self-aligning bearing is provided with an axial thrust movement preventing system along at least one bearing support structure. The system controls end play within an acceptable range without excessive frictional losses and enables the bearing to withstand considerable axial impact with no function impairment. In the preferred embodiment, the system includes a retaining ring mounted to a shaft supported by a self-aligning bearing. A thrust sleeve is mounted axially inboard of the retaining ring and is interconnectable with the ring. The thrust sleeve is positioned axially outboard of the self-aligning bearing and engages the bearing support structure when axially inward loads are imposed on the shaft.

10 Claims, 3 Drawing Figures

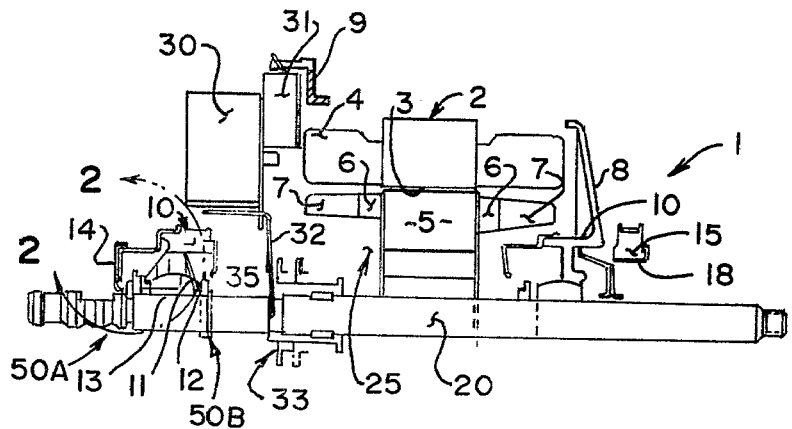
FIG. 1.
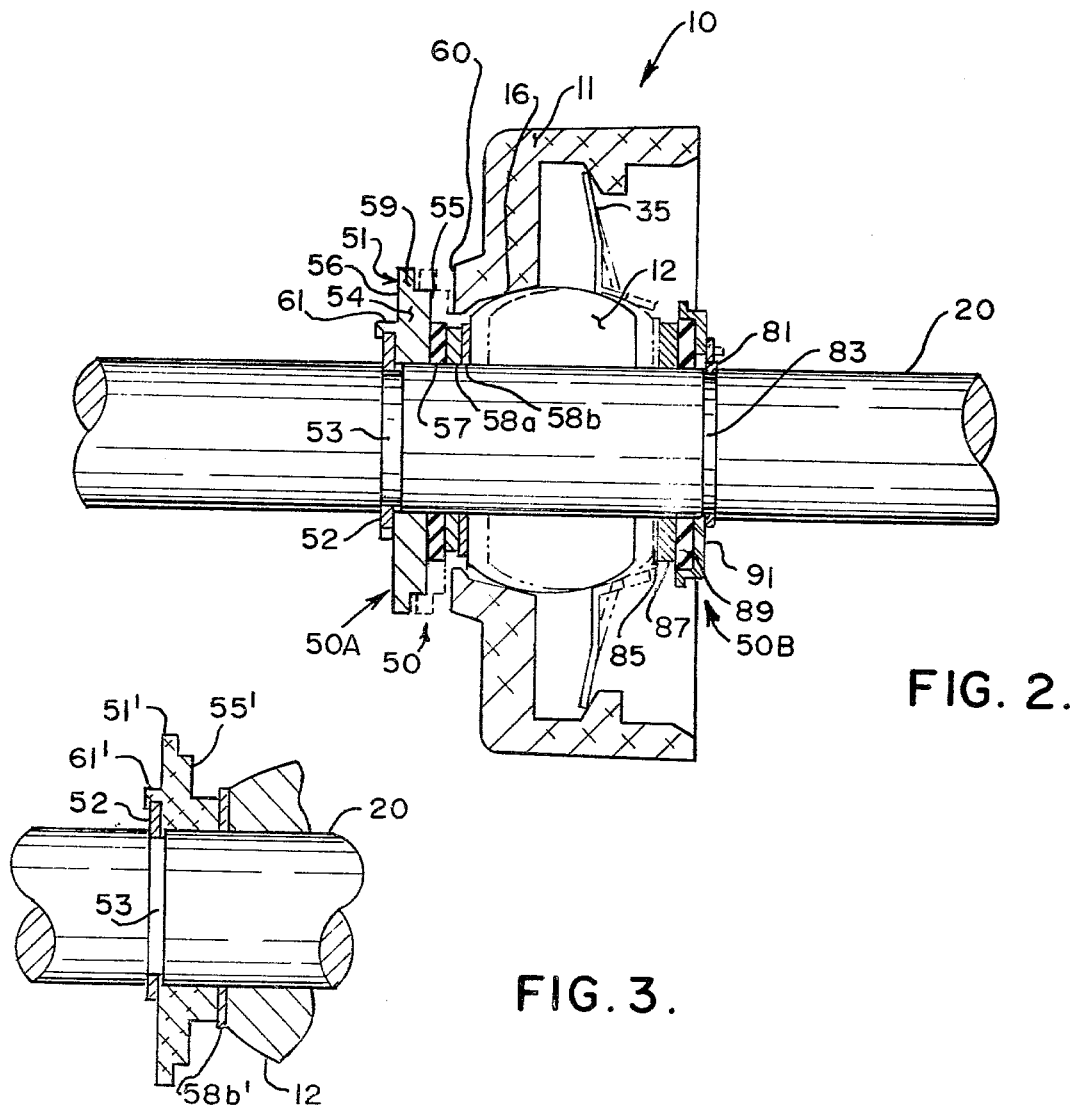
FIG. 2.
FIG. 3.

BEARING MOVEMENT PREVENTING SYSTEM

BACKGROUND OF THE INVENTION

This invention relates to axial thrust movement preventing means, and in particular, to an end play control system for a dynamoelectric machine. While the invention is described in particular detail with respect to an induction motor, those skilled in the art will recognize the wider applicability of the inventive concepts disclosed hereinafter.

Modern manufacturing techniques and assembly of dynamoelectric machines, for example, induction motors utilized in high volume appliances and the like, often employ die cast parts. Thus, it is prevalent in the motor industry to provide a stator assembly for an induction motor constructed from a plurality of laminations formed from magnetic material. The stator assembly has a central bore opening in it which is sized to receive a rotor assembly including a shaft. Conventionally, the shaft is supported at its ends by suitable bearings contained in motor end shields. The motor end shields typically are of a die cast aluminum construction, and they are mounted directly to the stator core by any suitable means, such as threaded fasteners or epoxy adhesive. General prior practice has been to machine the end shields, at least along the bearing support areas of the end shields. Machining a die cast part is a relatively expensive motor manufacturing procedure.

In the past, roller or ball bearings were used to journal the rotor shaft. More recently, self-aligning sleeve bearing systems have found wide application in such motor structures. Since the stator assembly and rotor assembly must be assembled with respect to one another to provide a minimum air gap between them for proper motor operation, a variety of techniques have been developed to assemble the parts through the use of shims and the like until the motor construction is completed. After the shims are removed, the rotor and stator remain aligned properly with one another through the now completed motor structure. Self-aligning bearings are particularly well adapted for this kind of construction technique because the motor parts, including the bearing structure, can be moved relative to one another during motor manufacture, the self aligning bearings thereafter attaining proper alignment with the motor shaft without further effort on the part of the motor manufacturer. Self-aligning bearings also eliminate the need for extensive machining of the end shields.

While self-aligning bearings work well for their intended purposes, in some motor applications severe axial forces are applied to the motor shaft, such as during transport or installation of the motor, which can damage the self-aligning bearings of the motor which, in turn, can lead to malfunction of the motor and shortened service life. For example, in dishwasher or disposal appliance applications, the motors often have their rotor and shaft placed vertically. It is known that the energization of the stator windings of the motor will tend to pull or align the rotor within the axial bore through the stator. These two factors often mean that any end play in the bearing sturcture permits excessive rotor assembly movement, which results in severe wear to the bearings and eventual failure of the motor. Conventionally, ball bearings have been used on at least one end of the motor structure. Axial impact forces applied to the motor shaft due to handling can be quite excessive, so that even ball bearings can fail. These axial impact forces acting on prior art self-aligning bearings can overstress the bearing retaining springs and drive the bearing out of its seat or race. While ball bearing structures have been employed in the environment described, manufacturing techniques required for their use include end shield machining. They consequently are more complicated and time consuming to manufacture, and thus are more expensive than motor designs empolying self-aligning bearings at both rotor assembly supporting points.

Other motor applications (e.g., applications employing split phase induction motors employing a motor starting switch for de-energizing the start winding upon the attainment of a predetermined speed of the rotor) are dependent upon the position of a centrifugal actuator for actuation of the switch. Excessive end play in the design of the motor bearing system can misposition the centrifugal actuator so that the motor switch operates improperly thus resulting in motor failure. This is a particularly acute problem with die cast aluminum end shields, which, as indicated above, preferably are not machined for economy of manufacture. One prior art solution has been to employ ball bearings on the switch end of the motor so that the axial dimensions with respect to the switch operating mechanism are controlled effectively.

A number of spring loaded systems have been proposed in which some type of spring structure is employed in an effort to reduce end play in self-aligning bearings. While spring loaded systems work for their intended purpose, they also impose friction losses which adversely affect motor efficiency. Also, when motors employing these self-aligning bearing restraining springs are subjected to excessive axial loading, the springs may be overstressed so that the springs do not properly bias their bearings in their races. This, in turn, can lead to premature failure of the bearing.

The invention disclosed hereinafter overcomes these prior art deficiencies and enables a motor manufacturer to employ self-aligning bearings on both ends of the motor structure by controlling end play within an acceptable range. The invention also enables the motor to withstand considerable handling forces with no functional impairment to the bearing system or axial misalignment of switch components. It further allows close control of end play in a simple self-aligning bearing motor without excessive frictional losses as are encountered with spring loaded systems previously proposed in the prior art.

One of the objects of this invention is to provide a simplified end play control system for dynamoelectric machines.

Another object of this invention is to provide an end play control system for a motor employing self-aligning bearings on each end of the motor structure.

Another object of this invention is to provide an end play control system having low frictional losses.

Another object of this invention is to provide a low cost control system capable of accurately positioning a centrifugal actuator in a motor without a machined stator or end shield.

Another object of this invention is to provide a low cost simplified motor bearing system.

Another object of this invention is to provide an end play control system capable of withstanding large axial loads on the motor shaft.

Other objects of this invention will be apparent to those skilled in the art in light of the following description and accompanying drawings.

SUMMARY OF THE INVENTION

In accordance with this invention, generally stated, a simplified end play control system for a dynamoelectric machine (e.g., an induction motor) is provided which prevents excessive axial movement of a motor shaft in response to forces applied to the shaft. The dynamoelectric machine includes a rotor shaft, a self-aligning bearing carried on the shaft, and a bearing support structure surrounding the shaft and journalling the self-aligning bearing member. A resilient retainer biases the self-aligning bearing into engagement with its journal. In the preferred embodiment, the shaft has means affixed thereto for preventing excessive axial movement of the bearing member in one axial direction of the shaft. This last said means is secured to the shaft against axial movement therealong on one side of the self-aligning bearing member opposite the retainer for transferring thrust between the shaft and the bearing support structure thereby to prevent excessive axial movement of the shaft and the self-aligning bearing member relative to the bearing support structure and to prevent overstressing the retainer.

BRIEF DESCRIPTION OF THE DRAWINGS

In the drawings,

FIG. 1 is a semi-diagrammatic longitudinal cross sectional view of an induction motor employing the end play control system of this invention;

FIG. 2 is an enlarged view of the end play control system employed in FIG. 1, taken about the area 2—2 of FIG. 1; and FIG. 3 is a view of an alternative embodiment of the end play control system shown in FIG. 2

Corresponding reference characters indicate corresponding parts throughout the several views of the drawings.

DESCRIPTION OF THE PREFERRED EMBODIMENT

Referring now to FIG. 1, reference numeral 1 indicates a dynamoelectric machine of the induction motor type. Conventionally, the motor 1 includes a stator core assembly 2 constructed from a plurality of individual laminations of magnetic sheet material. The stator core assembly has a central bore opening 3 formed in it. A plurality of radially extending, winding receiving slots (not shown) communicate with the bore opening 3. Motor windings 4 are positioned in the slots of the stator in a conventional manner. The bore opening 3 is sized to receive a corresponding rotor assembly 25. The rotor assembly 25 includes a rotor 5 mounted on a shaft 20. Rotor 5 body also is constructed from a plurality of laminations and preferably is a squirrel cage rotor design having the rotor bars of its squirrel cage shorted by end rings 6 positioned at opposite ends of the rotor. It also is conventional to provide fan blades 7 integrally cast with the end rings for circulating air over the motor components during operation thereof.

A pair of end shields 8 and 9 are positioned on opposite ends of the motor 1 and are assembled in relation to the motor 1 by any convenient method. For example, it is common to attach the end shields 8 and 9 directly to the stator core 2 of the motor 1. In other motor constructions, the stator and rotor core are enclosed within a cylindrical outer shell (not shown), and the end shields are attached to the motor shell. In those embodiments where the end shields are mounted directly to the stator assembly, attachment may be accomplished in a variety of ways. Typically, epoxy or other adhesives are employed for that attachment. The end shields each define a central hub 10 having a central bearing housing or bearing support structure 11 formed in it. Preferably, the bearing housing 11 houses a self-aligning bearing 12 and its associated wick lubricating system (not shown). The bearing 12 has a central opening 13 in it, which receives the shaft 20 of the rotor assembly 25.

End shield 9 is formed to permit reception of a motor switch 30 and motor protector 31. A particularly convenient method of construction and component parts thereof are described in a co-pending application by Bischoff, Ser. No. 941,916, filed Sept. 13, 1978, and assigned to the assignee of the present invention. The switch 30 is actuated by a lever 32 operated by a conventional centrifugal actuator 33, only parts of which are shown in FIG. 1 for drawing simplicity.

Commonly, either the bearing housing 11 or hub 10 is closed by an end cap 14 of convenient design. It also is common to provide a hub ring 15, also of conventional construction, around bearing housing 11 which permits the attachment of the motor 1 in a particular application. For drawing simplicity, only the hub ring 15 along an end 18 of the motor 1 is illustrated in detail.

As will be appreciated by those skilled in the art, the end sheild having the switch 30 associated with it is a critical end for component assembly, in that operation of the switch 30 is dependent upon precise relative locations of actuator 33 and lever 32. In the past, conventional roller bearings were used on this end of the motor, particularly in applications where axial loads were imposed on the shaft 20. I have found that such expensive bearing constructions may be eliminated in motor design, provided that an end play control system of my invention is incorporated in the motor structure.

As indicated, a number of structural arrangements are available for positioning the self-aligning bearing 12 within the bearing housing 11. Typical constructions are shown and described in the U.S. Patent to Daniels, U.S. Pat. No. 4,090,749, issued May 23, 1978, and the U.S. Patent to Lewis, U.S. Pat. No. 3,966,278, issued June 29, 1976. In both the Daniels and Lewis constructions, for example, a spring retainer 35 is utilized to bias the bearing 12 against a bearing seat 16 of the bearing housing 11 (see FIG. 2). Because bearing 12 is self-aligning, some movement of the bearing not only is desirable but required for proper bearing operation. Proper movement of the bearing 12 is rotational about its own center, which allows the angle of the bearing axis to vary with respect to the plane of the end shield/stator mounting face reference.

The end play control system of this invention includes means 50A axially affixed to shaft 20 for preventing inward movement (i.e, movement to the right in FIG. 2) of shaft 20. Means 50A is shown to include a thrust collar 51 and a stop ring 52. A thrust collar 91 and a stop 81 on the inboard side of bearing 12 constitutes means 50B for preventing outward movment of shaft 20. The above-noted inward and outward thrust prevention means function to eliminate the difficulties described above. Stop 52, in the embodiment illustrated, is an annular ring which is inserted in a circumferential groove 53 in the shaft 20. Groove 53 may be accurately positioned with respect to the remaining structural components of the motor 1 so that it functions as an axial reference point with respect to the stator 2 and rotor 5 of the motor 1. The stop ring 52 may have a variety of configurations. For example, it may have a plurality of tines which flex to permit its insertion over the shaft 20, the tines snap locking within the groove 53 when the stop 52 is positioned properly. Other constructional details are compatible with the broader aspect of this invention.

Thrust collar 51 has a body 54 having an end face 55 positioned on the bearing 12 side of body 54, and an end face 56 positioned on the stop 52 side of the body. Body 54 preferably formed of a suitable solid material, such as various plastic or metal materials. I find it desirable to insert a seal washer 57 and a pair of washers 58a, 58b between end face 55 of collar 51 and the outer end of bearing 12. Body 54 of collar 51 may be sized and designed to permit it to extend within the bearing housing 11 of the end shield 9, if desired. However, the particular embodiment shown in FIG. 2 is not so constructed. Washers 58a, 58b permit rotation of collar 51 with little frictional loss, while seal washer 57 prevents lubricating oil contained in bearing housing 11 from migrating down shaft 20 during rotation thereof. Seal washer 57 also serves to dampen axial vibrations that may occur during motor operation.

Body 54 of collar 51 has a radial flange 59 which extends radially outwardly and an inner face 55 adjacent to (but spaced from) an end surface 60 of bearing housing 11 (i.e., a gap is present between face 55 and surface 60) so as to permit limited axial movement of shaft 60 relative to bearing support 11. Body 54 also has a finger 61 which extends axially outwardly therefrom. Stop ring 52 has a radial slot (not shown) therein and finger 61 fits in this slot so as to operatively couple thrust collar 51 and stop ring 52. Since both stop ring 52 and collar 51 rotate with shaft 20, there are no frictional losses between the shaft and the stop. Upon inward axial movement of shaft 20 (i.e., movement of shaft 20 to the right as viewed in FIG. 2), face 55 of collar 51 engages surface 60 of bearing housing 60 and thus means 50A effectively prevents excessive inward movement of shaft 20 with respect to bearing housing 11.

Means 50B for preventing outward movement of shaft 20 is generally similar to means 50A heretofore described. Specifically, means 50B includes a stop ring 81 which is inserted in a circumferential groove 83 provided in shaft 20 inboard of bearing 12. An end play washer 85 is disposed against the inner face or end of spherical bearing member 12. A pair of thrust collars or washers 87 and 89 are held against end play washer 85 by means of a retainer 91 held in place by stop ring 81. It will be appreciated that a limited degree of axial movement (i.e., end play) between shaft 20 and end shield hub assembly 10 is permitted.

With shaft 20 and bearing 12 in their respective positions relative to hub 10 as shown by solid lines in FIG. 2, spring retainer 35 resiliently biases spherical bearing member 12 into engagement with its race 16. As shown in FIG. 2, a gap is present between face 60 of hub 10 and the inner face 55 of thrust collar 51. Upon an axial load being applied to shaft 20 in such direction as to force the shaft into motor 1 (i.e., toward the right as viewed in FIG. 1), spring retainer 35 will yieldably flex (as shown in dotted lines in FIG. 2) allowing thrust collar 51 to move toward hub surface 60. Upon collar 51 engaging hub surface 60, further inward axial movement of shaft 20 relative to hub 60 is positively prevented thereby preventing excessive axial loads from being applied to spring retainer 35. Thus, the spring retainer is not overstressed and upon removal of the axial load from shaft 20, the spring retainer will again bias spherical bearing member 12 into engagement with race 16.

Referring now to FIG. 3, another embodiment, such as indicated generally at 51', of thrust collar 51 is illustrated. As shown, collar 51' is a one-piece member incoporating the separate washers 57 and 58a illustrated in FIG. 2 which are disposed between thrust collar 51 and the outer end face of spherical bearing member 12.

While means 50A was herein described as including stop ring 52 fixed on shaft 20, it will be appreciated that means other than a thrust collar and stop ring secured to the shaft may be utilized to transfer thrust between shaft 20 and bearing support 11. For example, a shoulder (not shown) may be formed on shaft 20 to engage the bearing support.

Numerous variations, within the scope of the appended claims, will be apparent to those skilled in the art in light of the foregoing description and accompanying drawings. Thus, the particular design silhouettes of the end play retaining means and bearing structure may vary in other embodiments of this invention. While particular materials were described as preferred, other materials may be substituted or employed if desired. These variations are merely illustrative.

Having thus described the invention, what is claimed and desired to be secured by Letters Patent is:

1. In a self-aligning bearing system for a dynamoelectric machine or the like including a self-aligning bearing number, bearing support structure defining a race for said self-aligning bearing member, a retainer spring for holding said self-aligning bearing member in said bearing support structure, said self-aligning bearing member having an axial opening therethrough, a shaft received in said axial opening, wherein the improvement comprises: means for preventing excessive axial movement of said self-aligning bearing member in at least one axial direction of said shaft, this last-said means being on one side of said self-aligning bearing member opposite said retainer spring for transferring thrust between said shaft and said bearing support structure, said means being engageable with said bearing support structure thereby to prevent excessive axial movement of said shaft and said self-aligning bearing member relative to said bearing support structure and to prevent overstressing of said retainer, said movement preventing means comprising of stop fixed against axial movement on said shaft and a thrust collar interposed between said stop and said bearing member.

2. The improvement of claim 1 wherein said bearing member is journalled in said bearing support structure, and wherein a gap is present between said thrust collar and said bearing member.

3. The improvement of claim 1 including at least one washer interposed between said thrust collar and said bearing member.

4. The improvement of claim 3 further including oil seal washer means mounted on said shaft inboard of said thrust collar.

5. The improvement of claim 1 wherein said thrust collar and said stop are operatively connected.

6. A bearing system for a self-aligning bearing, comprising:
bearing support means defining a seat for a self-aligning bearing;

a self-aligning bearing mounted in said seat, said self-aligning bearing having an opening therethrough;
a shaft inserted through the said bearing opening, said shaft having an axially outboard side and an axially inboard side relative to said bearing;
means on the inboard side of said bearing cooperable with said bearing support means for resiliently retaining said bearing in place within said bearing support means; and
means for preventing excessive axial inboard movement of said bearing, said movement preventing means including a member on the outboard side of said bearing held against axial movement relative to said shaft and being engageable with said bearing support means, said shaft having a circumferential groove therein axially outboard of said bearing, said movement preventing means comprising a stop engageable with said groove and a thrust collar interposed between said stop and said bearing, said thrust collar being engageable with said bearing support means upon limited inward axial movement of said shaft relative to said bearing support means.

7. The bearing system of claim 6 further including bearing support means defining a seat for said self-aligning bearing, said retaining means comprising a spring for biasing said bearing against said bearing support means, said spring exerting an axial outward force on said bearing, said thrust collar being positioned to abut said bearing support means so as to prevent excessive axially inward forces from being applied to said spring.

8. The bearing system of claim 7 including at least one washer interposed between said thrust collar and said bearing.

9. The bearing system of claim 8 further including oil seal washer means mounted on said shaft inboard of said thrust collar.

10. The bearing system of claim 9 wherein said thrust collar and said stop are operatively interconected.

* * * * *